Dec. 23, 1924.
A. F. SHORE
SPRING SUPPORT FOR VEHICLES
Filed Feb. 7, 1923
1,520,483
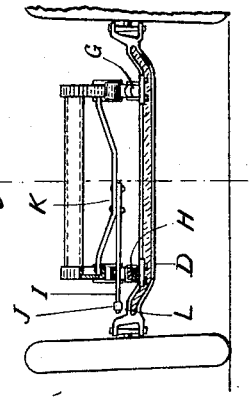
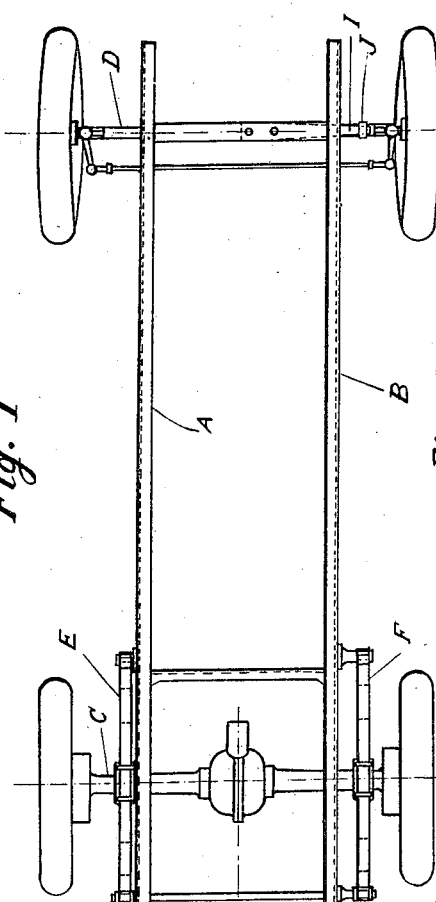
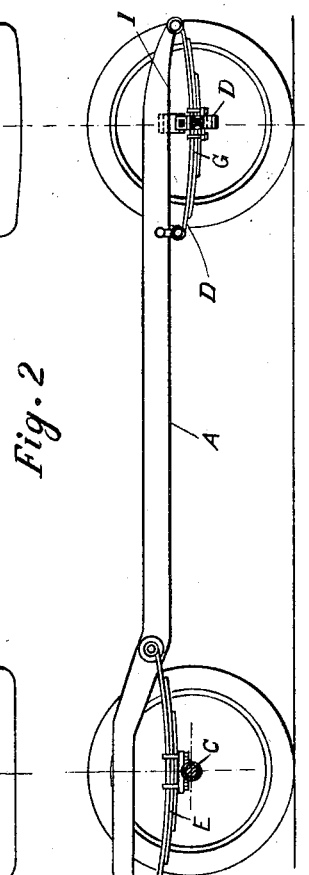
Albert F. Shore, INVENTOR
BY Geo. A. Hoffman, ATTORNEY Patented Dec. 23, 1924.

1,520,483

UNITED STATES PATENT OFFICE.

ALBERT F. SHORE, OF NEW YORK, N. Y.

SPRING SUPPORT FOR VEHICLES.

Application filed February 7, 1923. Serial No. 617,454.

*To all whom it may concern:*

Be it known that I, ALBERT F. SHORE, a citizen of the United States, residing at New York, in the county of New York and State of New York, have invented certain new and useful Improvements in Spring Supports for Vehicles, of which the following is a full, clear, and exact specification.

This invention relates to spring supports for vehicles, and especially to such a system for automobiles, and the main object of the invention is to provide a spring support adapted to overcome or alleviate the more intense vertical shocks communicated to a vehicle body and its passengers or contents when said vehicle is moving at the higher road speeds.

An important feature of the invention is the provision of a spring support the spring members attached to an axle of which are so positioned as to afford unequal acceleration at the two ends; that is, when springs of substantially equal compressibility are employed one is placed farther from the centre of the axle and therefore nearer its wheel than is the case with the other spring.

Another important feature of the invention is the provision of an unequally balanced spring system as above, in which such inequality is attained by employing similar main spring members adjacent to either end of the axle and adding thereto adjacent to one of said springs an auxiliary spring for transferring the combined spring resistance at one end of the axle to a point nearer the axle centre than at the other end.

These and other important objects not hereinbefore referred to will be hereinafter described and claimed and are illustrated in the accompanying drawing, in which Figure 1 is a plan view showing an automobile frame provided with my improved spring support;

Fig. 2 is a side elevation of the same, with the near-side wheels removed, and with certain parts shown in section;

Fig. 3 is a forward end view of a spring support for the front axle, with associated parts, and partly in section, and Fig. 4 is a similar view illustrating a modification of the spring support shown in Fig. 3.

Similar characters designate like parts in all the figures of the drawing.

It is well known that the shocks that are most annoying and injurious to passengers and contents of a motor vehicle are those caused by an obstruction lying at a right angle to the line of movement of said vehicle. Such an obstruction may be the rails of a track, a depression for drainage or other purpose in which the farther side or bank becomes an obstruction, or any other obstacle presented simultaneously to both front wheels or to both back wheels. Shocks produced by such an obstruction may be so severe as to greatly hasten or increase fatigue or even to cause serious injury to the spine. Obstructions lying at other than a right angle and therefore struck by but one wheel at a time will cause but half of this shock to be transmitted to the spring system and through this to passengers or contents of the vehicle.

Waves of vibration, it is well known, are difficult to oppose in a straight line against the point of origin. It is possible, however, to deflect waves of vibration in another direction, at an angle to the line of origin, with the result that beyond the point of angular deflection the intensity of the waves transmitted in the original direction will be materially reduced.

In a co-pending application filed by me on April 11, 1921, Serial No. 460,193, I sought to accomplish this deflection of vibration and transmission of but part of the combined shock of two wheels by a form of suspension having relatively stiff spring means arranged in opposite sides of the vehicle. This arrangement would, upon an obstacle or depression being struck by both wheels simultaneously, cause a slight swaying or rotation of the suspended body on a longitudinal axis, the response being more complete at slow and moderate speeds than at high speeds. Further tests have demonstrated that in order to secure the desired deflection of vibration or swaying of the body in the event of otherwise parallel vertical end throw from the wheels when under high speed, a suitable accelerating means is necessary. When longitudinal elliptic or part-elliptic springs are used the required acceleration may be obtained on the rear axle by setting one of the springs farther out and nearer to its wheel than the other. On account of the space required for the side movement of the wheels to permit steering this method can not be used on the front axle, hence an auxiliary device having the same accelerating equivalent is found to be necessary, and is shown in the drawings. In such a combination provision should be made for avoiding any undue sag of the suspended body when loaded and at rest due to the use of opposite springs of unequal power.

In the pending application before mentioned I make this provision by having unequal powers at one end of the car only, or in both ends of the car by reversing the alternations. Under the higher speeds it has been found to be advantageous to have the stiffer spring means farther from the longitudinal centre than the other spring, on either axle. The reason for this construction is that under the higher speeds there is not time enough for the body to respond rotatively unless the rear part of the body receive an acceleration on the same side and which is auxiliary to that of the front axle.

The desired acceleration and the maintenance of equilibrium when at rest I accomplish in the following manner:

Referring to the drawing, I have shown herein only such portions of an automobile chassis as are necessary to illustrate the present invention, A and B designating the longitudinal frame members, C the rear axle, D the front axle, E and F the rear springs, and G and H the front springs of an automobile. At I is shown an offset spring which is normally disengaged, as under light shocks, but which under heavy shocks seats on the outer part L of the axle, but is so set as to be out of the way of the wheel when steering. The rubber covering J near the end of the spring I serves as a cushion to prevent all sounds or vibrations that might otherwise arise. An anchoring brace for the spring I is shown at K, and this brace may be a special or a standardized part of the frame such as is usually located in this part of the longitudinal frame. The offset spring I is adapted to throw the body of the machine somewhat harder when jolted than is possible on the other side. It will be seen by referring to the drawing, Fig. 1, that the spring F is located nearer its wheel, that is, farther from the center of its axle, than is the spring E, the placing of the spring in this position causing the desired acceleration required at this end of the machine. The springs E and F may be of approximately the same power. It will be seen that the spring I reaches out farther than the regular longitudinal spring could be arranged, as the latter would be in the way of the wheel of the machine in steering.

From the preceding detailed description it will be clear that the main object of the present invention, though admitting of many variations of specific means for its accomplishment, is to provide a spring suspension system in which the spring means on one side of the vehicle is so fashioned and positioned that its vertical throwing power is more effective for each spring on that side than is the vertical throwing power for each spring on the other side, thus imparting a slightly rolling motion to the suspended body upon quickly passing over an obstruction lying across the road and meeting both front wheels at the same time and almost immediately both rear wheels at the same time. In other words, the spring members on the two axles, in my improved system, are so positioned that the springs having the greater throwing power for the body are arranged in tandem on one side of the vehicle, and the springs having slighter throwing power for the body are arranged in tandem on the other side.

In Fig. 4 I have shown a modified form of the invention adapted for use at the forward axle. Herein a set member M attached to the body is adapted to cooperate under heavy road shocks with an auxiliary spring member seated on the axle at L. The action at these times is such as to add the spring effect to that of the main spring and thus overbalance the spring on the other side of the axle. The resultant effect of the main and auxiliary springs is equivalent to that of a single spring on the same side but differently positioned, as in other forms of my invention.

It will be apparent that although I have illustrated main springs placed longitudinally of the frame, springs placed transversely or otherwise may be employed and are within the scope of this invention. Thus, I may employ transverse springs so positioned that the throwing power thereof is greater at one side of a vehicle than at the other side, as by so placing springs that one end thereof approaches nearer the wheel on its side than does the other end to its wheel.

What I claim is:—

1. A spring support for vehicles, embodying an axle, wheels on said axle, an elliptic spring secured to the axle adjacent to one wheel, a similar spring secured to the axle adjacent to but nearer its wheel, and a vehicle frame suspended on said springs.

2. A spring support for vehicles, embodying an axle, wheels mounted on said axle, springs mounted on said axle adjacent to each of said wheels, said springs being at unequal distances from the center of the axle, and a vehicle frame suspended on said springs.

3. A spring support for vehicles, embodying an axle, wheels on said axle, a spring on said axle adjacent to each of said wheels, and an auxiliary spring adjacent to one of said wheels and adapted to be brought into play under abnormal road shocks.

4. A spring suspension system for vehicles, embodying front and rear axles, wheels on said axles, a spring on the rear axle adjacent to each wheel, one of said springs being located farther from the center of the axle than said other spring, springs on the front axle, and an auxiliary spring adjacent to one of said front wheels and adapted to be brought into play under abnormal road shocks.

5. A spring support for vehicles, embodying an axle, wheels on said axle, springs on said axle, and an auxiliary spring on one end of said axle adapted to act against the suspended frame at a point to one side of that of a centrally placed spring, said spring being normally out of action but which contacts with the frame and acts to throw up one side thereof more forcibly than the other when the vehicle is subjected to abnormal road shocks.

In testimony whereof, I affix my signature.

ALBERT F. SHORE.